United States Patent
Uchiyama et al.

(10) Patent No.: US 10,518,452 B2
(45) Date of Patent: Dec. 31, 2019

(54) INJECTION MOLDING MACHINE MANAGEMENT SYSTEM

(71) Applicant: FANUC CORPORATION, Yamanashi (JP)

(72) Inventors: Tatsuhiro Uchiyama, Yamanashi (JP); Kazuo Kubota, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 240 days.

(21) Appl. No.: 15/586,572

(22) Filed: May 4, 2017

(65) Prior Publication Data
US 2017/0334113 A1    Nov. 23, 2017

(30) Foreign Application Priority Data
May 18, 2016  (JP) ................................. 2016-099787

(51) Int. Cl.
G06F 19/00    (2018.01)
B29C 45/76    (2006.01)
B29C 45/00    (2006.01)

(52) U.S. Cl.
CPC .......... *B29C 45/76* (2013.01); *B29C 45/0084* (2013.01); *B29C 2045/7606* (2013.01); *B29C 2945/76939* (2013.01)

(58) Field of Classification Search
CPC .. B29C 2045/7606; B29C 2945/76939; B29C 45/0084; B29C 45/76
See application file for complete search history.

(56) References Cited

U.S. PATENT DOCUMENTS

| 5,777,895 A | * | 7/1998 | Kuroda | .................. | H04M 11/00 340/539.2 |
| 6,433,687 B1 | * | 8/2002 | Yamaashi | ............. | G01S 5/0027 340/286.14 |
| 2004/0148039 A1 | * | 7/2004 | Farchmin | ............. | G05B 19/122 700/79 |

(Continued)

FOREIGN PATENT DOCUMENTS

| CN | 104943054 | 9/2015 |
| JP | 9-141539 | 6/1997 |

(Continued)

OTHER PUBLICATIONS

Notification of Reasons for Refusal dated Jun. 26, 2018 in Japanese Patent Application No. 2016-099787.

(Continued)

*Primary Examiner* — Zhipeng Wang
(74) *Attorney, Agent, or Firm* — Wenderoth, Lind & Ponack, L.L.P.

(57) ABSTRACT

It is made possible to understand the operating states of each injection molding machine (1) and the position of each operator within a molding factory at a glance and in real-time. An injection molding machine management system (100) displays the position of each injection molding machine (1) and the position of each operator within a molding factory, based on positional information of each injection molding machine (1) within the molding factory stored in advance in a storage unit (21), and operator positional information of each operator acquired by an operator positional information acquisition part (201).

5 Claims, 15 Drawing Sheets

(56) References Cited

U.S. PATENT DOCUMENTS

| | | | | |
|---|---|---|---|---|
| 2009/0092700 A1* | 4/2009 | Yokoyama | ............. | B22D 17/32 |
| | | | | 425/135 |
| 2011/0279261 A1* | 11/2011 | Gauger | .................... | F16P 3/14 |
| | | | | 340/539.1 |
| 2015/0066550 A1* | 3/2015 | Harada | .................. | G06Q 10/06 |
| | | | | 705/7.11 |
| 2015/0332073 A1* | 11/2015 | Murphy | ............. | G06K 7/10366 |
| | | | | 340/10.1 |

FOREIGN PATENT DOCUMENTS

| JP | 2003-340866 | 12/2003 |
|---|---|---|
| JP | 2004-155053 | 6/2004 |
| JP | 2004155053 A * | 6/2004 |
| JP | 2006-248038 | 9/2006 |
| JP | 2006-285632 | 10/2006 |
| JP | 2010-55220 | 3/2010 |
| JP | 2014-164598 | 9/2014 |
| JP | 2014-174947 | 9/2014 |
| JP | 2015-103032 | 6/2015 |

OTHER PUBLICATIONS

Office Action dated Feb. 15, 2019 in Chinese Application No. 201710338134.8.

* cited by examiner

| OPERATOR ID INFORMATION | OPERATOR A | OPERATOR B | OPERATOR C | ... |
|---|---|---|---|---|
| QUALIFICATION INFORMATION | PLASTIC MOLDING TECHNICIAN, FIRST GRADE | PLASTIC MOLDING TECHNICIAN, SECOND GRADE | SPECIALTY PLASTIC MOLDING TECHNICIAN | ... |
| WORK SHARING | MAINTENANCE | MACHINE OPERATION | MAINTENANCE MACHINE OPERATION | ... |

| INJECTION MOLDING MACHINE ID INFORMATION | OPERATOR ID INFORMATION | | | OPERATING STATE | PRODUCTION NUMBER | POSITIONAL INFORMATION OF INJECTION MOLDING MACHINE |
| --- | --- | --- | --- | --- | --- | --- |
| | OPERATOR A | OPERATOR B | OPERATOR C | | | |
| MACHINE NO. 1 | P(1,1) | P(1,2) | P(1,3) | S(1) | N(1) | L(1) |
| MACHINE NO. 2 | P(2,1) | P(2,2) | P(2,3) | S(2) | N(2) | L(2) |
| MACHINE NO. 3 | P(3,1) | P(3,2) | P(3,3) | S(3) | N(3) | L(3) |
| .. | .. | .. | .. | .. | .. | .. |
| MACHINE NO. 6 | P(6,1) | P(6,2) | P(6,3) | S(6) | N(6) | L(6) |

FIG. 5

OPERATING STATE DISPLAY SCREEN

| MACHINE NO. 1 | |
|---|---|
| OPERATING STATE | AUTOMATIC OPERATION |
| PRODUCTION NUMBER | 1,200 |
| OPERATOR | NOT HERE |

| MACHINE NO. 2 | |
|---|---|
| OPERATING STATE | SEMI-AUTOMATIC OPERATION |
| PRODUCTION NUMBER | 600 |
| OPERATOR | A |

| MACHINE NO. 3 | |
|---|---|
| OPERATING STATE | AUTOMATIC OPERATION |
| PRODUCTION NUMBER | 2,500 |
| OPERATOR | NOT HERE |

| MACHINE NO. 4 | |
|---|---|
| OPERATING STATE | DURING STOP |
| PRODUCTION NUMBER | 3,400 |
| OPERATOR | NOT HERE |

| MACHINE NO. 5 | |
|---|---|
| OPERATING STATE | DURING AUTOMATIC OPERATION |
| PRODUCTION NUMBER | 100 |
| OPERATOR | NOT HERE |

| MACHINE NO. 6 | |
|---|---|
| OPERATING STATE | DURING STOP |
| PRODUCTION NUMBER | 4,200 |
| OPERATOR | B |

OPERATOR NOT PERFORMING WORK

| OPERATOR C |
|---|

FIG. 6

| INJECTION MOLDING MACHINE ID INFORMATION | OPERATING STATE | PRODUCTION NUMBER | POSITIONAL INFORMATION OF INJECTION MOLDING MACHINE |
|---|---|---|---|
| MACHINE NO. 1 | S(1) | N(1) | L2(1) |
| MACHINE NO. 2 | S(2) | N(2) | L2(2) |
| MACHINE NO. 3 | S(3) | N(3) | L2(3) |
| ⋮ | ⋮ | ⋮ | ⋮ |
| MACHINE NO. 6 | S(6) | N(6) | L2(6) |

| OPERATOR ID INFORMATION | OPERATOR A | OPERATOR B | OPERATOR C |
|---|---|---|---|
| OPERATOR POSITIONAL INFORMATION | POS(A) | POS(B) | POS(C) |

FIG. 11

OPERATING STATE DISPLAY SCREEN

| MACHINE NO. 1 | |
|---|---|
| OPERATING STATE | AUTOMATIC OPERATION |
| PRODUCTION NUMBER | 1,200 |

| MACHINE NO. 2 | |
|---|---|
| OPERATING STATE | SEMI-AUTOMATIC OPERATION |
| PRODUCTION NUMBER | 600 |

| MACHINE NO. 3 | |
|---|---|
| OPERATING STATE | AUTOMATIC OPERATION |
| PRODUCTION NUMBER | 2,500 |

OPERATOR A

| MACHINE NO. 4 | |
|---|---|
| OPERATING STATE | DURING STOP |
| PRODUCTION NUMBER | 3,400 |

| MACHINE NO. 5 | |
|---|---|
| OPERATING STATE | DURING AUTOMATIC OPERATION |
| PRODUCTION NUMBER | 100 |

| MACHINE NO. 6 | |
|---|---|
| OPERATING STATE | DURING STOP |
| PRODUCTION NUMBER | 4,200 |

OPERATOR C

OPERATOR B

FIG. 12

INJECTION MOLDING MACHINE MANAGEMENT SYSTEM

This application is based on and claims the benefit of priority from Japanese Patent Application No. 2016-099787, filed on 18 May 2016, the content of which is incorporated herein by reference.

BACKGROUND OF THE INVENTION

Field of the Invention

The present invention relates to an injection molding machine management system consisting of a plurality of injection molding machines within a molding factory and a management computer for managing the injection molding machines.

Related Art

Conventionally, in a molding factory, in order to improve the operating rate of injection molding machines, it is important to remove the stoppage cause in a short time and recover in the case of the injection molding machine stopping. The occurrence of an alarm, completion of production, running out of resin, etc. can be exemplified as stoppage causes of an injection molding machine. Generally, in a molding factory, one operator is in charge of a plurality of injection molding machines, and often performs the start or end of production of an injection molding machine, preparation for production start, handling of cases of an injection molding stopping, etc. when necessary.

For this reason, as a means for notifying to the operator that work at an injection molding machine within the molding factory has become necessary, a means for notifying the operator has been known by installing a warning lamp, and/or buzzer, etc. to the injection molding machine, and using the sight of the warning lamp and/or sound of the buzzer, etc. when work is required at the injection molding machine. Furthermore, in place of providing a dedicated warning light, Patent Document 1 describes the matter of letting the operator know the operating state of a machine by way of differences in the background color of a screen displayed on a display device provided to the injection molding machine and in the display method. In addition, Patent Document 2 describes a method that, in a case of managing work history data of an injection molding machine in the case of molding a molded article by way of this injection molding machine, collectively stores operator information corresponding to the work history data, and displays the operator information corresponding to work history data.

In addition, as a method of collectively managing the operation state of a plurality of injection molding machines within a molding factory, Patent Document 3 describes an operation state display method for molding machines that collectively displays the operation state of respective molding machine. In addition, Patent Document 4 describes an operation support system that includes a detection means for detecting the position of an operator, in the case of the operator managing respective molding machines while moving between a plurality of molding machines, then estimates an operation being performed by the operator based on the positional information of the operator detected, corrects a production schedule based on the estimation result, and instructs a next operation to the operator according to the production schedule.

Patent Document 1: Japanese Unexamined Patent Application, Publication No. H9-141539
Patent Document 2: Japanese Unexamined Patent Application, Publication No. 2006-248038
Patent Document 3: Japanese Unexamined Patent Application, Publication No. 2003-340866
Patent Document 4: Japanese Unexamined Patent Application, Publication No. 2010-055220

SUMMARY OF THE INVENTION

In the case of work becoming necessary at an injection molding machine, with the method of letting the operator know the operating state of the machine by way of differences in the background color of the screen displayed on the display device provided to the injection molding machine and in display method, as described in Patent Document 1, there is a problem in that an operator will not recognize the fact that work is required if not present near the injection molding machine requiring work. In addition, there is a problem in that, even if being near the injection molding machine requiring work, the operator is not able to handle it in the case of performing work at another injection molding machine. In addition, although it is possible to understand the work performed by an operator in the past at an injection molding machine according to history information in Patent Document 2, it is not possible to understand information relating to operators currently performing work at injection molding machines and the work contents. With the conventional centralized management system for injection molding machines shown in Patent Document 3, although the factory manager can understand the operating status of injection molding machines, it has not been possible to perform an appropriate work instruction to an operator, even when an injection molding machine requiring work arises, since there is no information relating to the operators. In addition, the operation support system described in Patent Document 4 does not include a means for displaying the installation position of each injection molding machine and the positional relationships of each operator. Therefore, it has not been possible for a factory manager to understand at a glance the arrangement position of each injection molding machine and position of each operator within a molding factory, find an operator performing work nearest an injection molding machine requiring work, for example, and perform a work instruction.

The present invention has an object of providing an injection molding machine management system that allows understanding at a glance in real-time the operating state of each injection molding machine and position of each operator within a molding factory.

According to a first aspect of the present invention, an injection molding machine management system (for example, the injection molding machine management system 100 described later) includes: a server terminal (for example, the server terminal 2, 2A described later); and a plurality of injection molding machines (for example, the injection molding machine 1, 1A described later) which are communicably connected with the server terminal, in which the injection molding machine includes a control unit (for example, the control unit 10, 10A described later), in which the server terminal includes a storage unit (for example, the storage unit 21, 21A described later) and a control unit (for example, the control unit 20, 20A described later), in which the storage unit stores positional information of each of the injection molding machines within a molding factory, in which the control unit of the server terminal has: an operator positional information acquisition part (for example, the operator positional information acquisition part 201, 201A described later) that acquires operator positional information within the molding factory of an operator operating each of the injection molding machines, and an injection molding machine operating state display screen generation part (for example, the injection molding machine operating state display screen generation part 204, 204A described later) that generates a display screen for simultaneously displaying arrangement positions of each of the injection molding machines and a work position of each operator within the molding factory, based on operator positional information within the molding factory of the operators acquired by the operator positional information acquisition part, and positional information of the injection molding machines stored in the storage unit.

According to a second aspect of the present invention, in the injection molding machine management system as described in the first aspect, it may be configured so that the injection molding machine includes an input unit (for example, the input unit 13 described later), the control unit of the injection molding machine has an operator ID information registration processing part (for example, the operator ID information registration processing part 101 described later) that transmits, to the server terminal, operator ID information of an operator who operates the injection molding machine inputted via the input unit, and injection molding machine ID information of the injection molding machine, and the operator positional information acquisition part (for example, the operator positional information acquisition part 201 described later) acquires an arrangement position of the injection molding machine as the operator positional information of the operator, based on the operator ID information and the injection molding machine ID information transmitted from the operator ID information registration processing part.

According to a third aspect of the present invention, it may be configured so that the injection molding machine management system as described in the first aspect further includes an operator position detection part (for example, the position detection system 400 described later) that measures the operator positional information by detecting a position of the operator within the molding factory, in which the operator positional information acquisition part (for example, the operator positional information acquisition part 201A described later) acquires the operator positional information measured by the operator position detection part.

According to a fourth aspect of the present invention, in the injection molding machine management system as described in the third aspect, it may be configured so that the operator position detection part further detects operator ID information of the operator, and the operator positional information acquisition part acquires operator ID information of the operator detected by the operator position detection part.

According to a fifth aspect of the present invention, in the injection molding machine management system as described in the second or fourth aspect, it may be configured so that the operator ID information at least includes one among qualification information and work sharing information of the operator.

According to a sixth aspect of the present invention, in the injection molding machine management system as described in any one of the first to fifth aspects, it may be configured so that the control unit of the injection molding machine further includes an injection molding machine operating information upload part (for example, the injection molding machine operating information upload part 103, 103A described later) that sends injection molding machine operating information of the injection molding machine to the server terminal; the control unit of the server terminal further includes an injection molding machine operating information acquisition part (for example, the injection molding machine operating information acquisition part 202, 202A described later) that acquires a plurality of sets of the injection molding machine operating information from a plurality of the injection molding machines; and the injection molding machine operating state display screen generation part generates a display screen for displaying the operating information of each of the injection molding machines within the molding factory simultaneously with the arrangement positions of the injection molding machines and work positions of each operator, based on operating information of the plurality of the injection molding machines acquired by the injection molding machine operating information acquisition part.

According to a seventh aspect of the present invention, in the injection molding machine management system as described in the sixth aspect, it may be configured so that the injection molding machine operating information includes at least one among information of whether the injection molding machine is during automatic operation, during semi-automatic operation, during stop, an alarm has occurred, a production number of the injection molding machine, and a scheduled production number of the injection molding machine.

According to an eighth aspect of the present invention, in the injection molding machine management system as described in the sixth aspect, it may be configured so that the control unit of the server terminal further includes a work instruction information notification part (for example, the work instruction information notification part 206, 206A described later) that outputs work instruction information related to the operator, based on injection molding machine operating information of the plurality of the injection molding machines acquired by the injection molding machine operating information acquisition part, operator positional information of the operators, and positional information of the injection molding machines.

According to a ninth aspect of the present invention, it may be configured so that the injection molding machine management system as described in the first aspect further includes: a first server terminal (for example, the host server terminal 5B, 5C described later); a second server terminal (for example, the server terminal 2B, 2C described later); and an injection molding machine group (for example, the injection molding machine group 50 described later) that includes the second server terminal and a plurality of the injection molding machines, in which the second server terminal is communicably connected with the first server terminal, in which functions of the server terminal are decentralized to the first server terminal and the second server terminal, and in which the first server terminal centrally manages arrangement information of each of the injection molding machines included in the injection molding machine group and work information of each operator.

According to the present invention, it is possible to understand at a glance in real-time the operating state of each injection molding machine and position of each operator within a molding factory.

BRIEF DESCRIPTION OF THE DRAWINGS

FIG. 4 is a view showing an example of qualification information, work sharing information, etc. for every operator according to the first embodiment;

FIG. 5 is a view showing the configuration of an injection molding machine operating state table according to the first embodiment;

FIG. 6 is a view showing an example of an injection molding machine operating state display screen according to the first embodiment;

FIG. 11 is a view showing the configuration of an injection molding machine operating state table according to the second embodiment;

FIG. 12 is a view showing an example of an injection molding machine operating state display screen according to the second embodiment.

DETAILED DESCRIPTION OF THE INVENTION

First Embodiment

Figure 1:
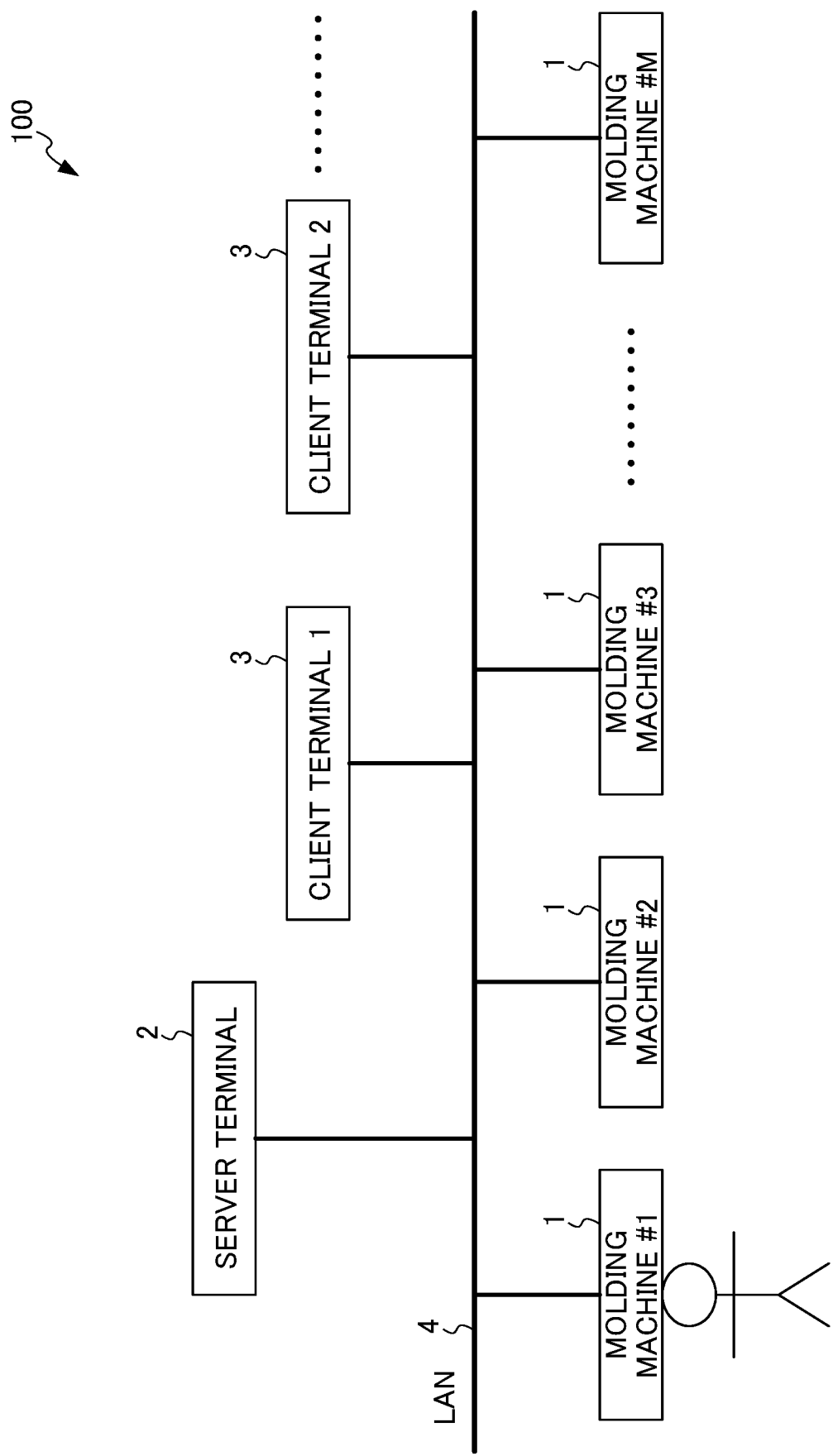
FIG. 1 is a view showing the configuration of an injection molding machine management system according to a present embodiment.

Hereinafter, the functional configuration of an injection molding machine management system according to a preferred embodiment of the present invention will be explained while referencing the drawings. FIG. 1 is a view showing the system configuration of the injection molding machine management system.

As shown in FIG. 1, the injection molding machine management system 100 is configured to include a plurality of injection molding machines 1 installed within a molding factory, a server terminal 2, any number (including zero) of client terminals 3, and a molding factory internal network 4 (e.g., LAN).

(Regarding Injection Molding Machine 1)

Figure 2:
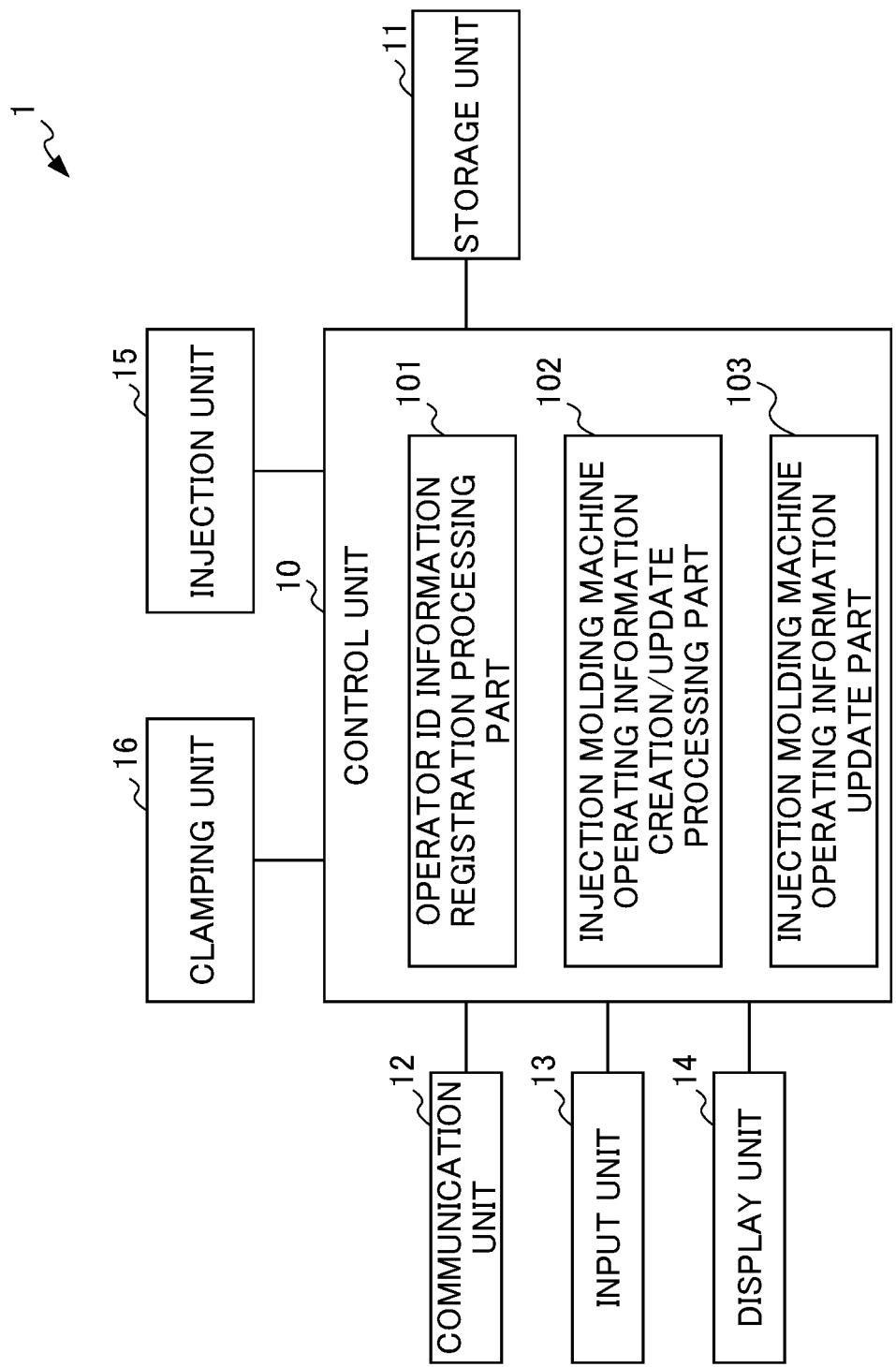
FIG. 2 is a view showing the configuration of an injection molding machine management system according to a first embodiment.

As shown in FIG. 2, the injection molding machine 1 includes a control unit 10, a storage unit 11, a communication unit 12, an input unit 13, a display unit 14, an injection unit 15 and a clamping unit 16.

The control unit 10 is configured from a microprocessor, etc., for example, executes each program read from the storage unit 11, and performs control of the injection unit 15, clamping unit 16, etc. In addition, upon this execution, it reads information from the storage unit 11, performs writing of information into the storage unit 11, and performs control of the communication unit 12, input unit 13, display unit 14, etc.

The storage unit 11 is configured by semiconductor memory, a hard disk drive, etc., for example, and stored therein are various programs such as a sequence program that controls sequence operations of the injection molding machine 1, a motion axis control program that controls motion of each axis of the injection molding machine 1, and a robot control program that controls the servomotors of each axis, molding conditions related to injection molding work, molding data such as various setting values, parameters and macro variables, and injection molding machine operating information described later.

The communication unit 12 is configured with LAN as the target, for example, and receives instructions from the control unit 10, and transmits data between the server terminal 2 via a molding factory internal network. The input unit 13 is configured by an input device such as a keyboard and touch panel provided to overlap the display screen of the display unit, and an IC card reader, bar code reader, IC tag reader or the like. The display unit 14 is configured by a display device such as a liquid crystal display, for example, and receives instructions from the control unit 10 to display a screen.

The control unit 10 is configured from a microprocessor or the like, and performs control of the respective constituent units. In addition to the known functional parts of the injection molding machine 1 such as the sequence control part (not illustrated) that controls a sequence operation of the injection molding machine 1, the motion axis control part (not illustrated) that drives and controls each axis of the injection molding machine 1, and servo control part (not illustrated) that controls the servomotors of each axis, the control unit 10 includes an operator ID information registration processing part 101, injection molding machine operating information creation/update processing part 102, and injection molding machine operating information upload part 103, as shown in FIG. 2.

The operator ID information registration processing part 101 records in the storage unit 11 the operator ID information of operators that operate the injection molding machine 1 inputted via the input unit 13, and sends to the server terminal 2 via the communication unit 12 along with time information during operator ID information input to be associated with the injection molding machine ID information. It should be noted that, in the case of the operators that operate the injection molding machine 1 being a plurality of people, the operator ID information inputted for every respective operator is stored in the storage unit 11, and sent to the server terminal 2. The operator ID information, for example, may be operator ID information inputted via the input unit 13 by way of a password inputted upon the operator performing work at the injection molding machine 1, or an IC card, card with passcode or IC tag possessed by the operator, or the like, or operator ID information directly inputted by the operator from the input unit 13. The operator ID information may be configured to include at least one among qualification information and work sharing information of the operator.

The injection molding machine operating information creation/update processing part 102 creates and updates injection molding machine operating information including the operating state related to injection molding work of the injection molding machine 1 (for example, during automatic operation, during semi-automatic operation, during manual operation, during stop, alarm occurrence, etc.), operator information of this injection molding machine (in a case of the operator performing work at this injection molding machine 1, the operator ID information of this operator, in the case of nobody performing work, information that operator not present as operator ID information), scheduled production number of articles produced by this injection molding machine 1, production number of articles produced by this injection molding machine 1, etc., and records in the storage unit 11 along with the time information during operating information acquisition of this injection molding machine operating information with the injection molding machine ID information as a key. More specifically, the injection molding machine operating information creation/update processing part 102 creates injection molding machine operating information including the scheduled production number of articles produced by this injection molding machine 1, based on molding conditions related to the injection molding work, various setting values, etc. stored in advance in the storage unit 11, when power is supplied to the injection molding machine 1. After operation of the injection molding machine 1, the injection molding machine operating information is updated when determining the operating state such as if the injection molding machine 1 is in an alarm occurrence state, if during manual operation, if during automatic operation, if during semi-automatic operation, or if during stop, every predetermined period, and determining that the operating state changed. In addition, the injection molding machine operating information creation/update processing part 102 updates the operator information in the injection molding machine operating information, when the operator ID information is inputted by the operator ID information registration processing part 101. Furthermore, the injection molding machine operating information creation/update processing part 102 updates the production number of articles produced in the injection molding machine operating information, when articles are produced by the injection molding machine 1.

The injection molding machine operating information upload part 103 sends the injection molding machine operating information of this injection molding machine thus created and updated by the injection molding machine operating information creation/update processing part 102, to the server terminal 2 via the communication unit 12. More specifically, the injection molding machine operating information upload part 103 sends this injection molding machine operating information along with the time information during operating information creation/update thereof to the server terminal 2 with the injection molding machine ID information as a key. It should be noted that the injection molding machine operating information upload part 103 may be configured so as to send information having an update, among the injection molding machine operating information stored in the storage unit 11.

(Regarding Server Terminal 2)

Figure 3:
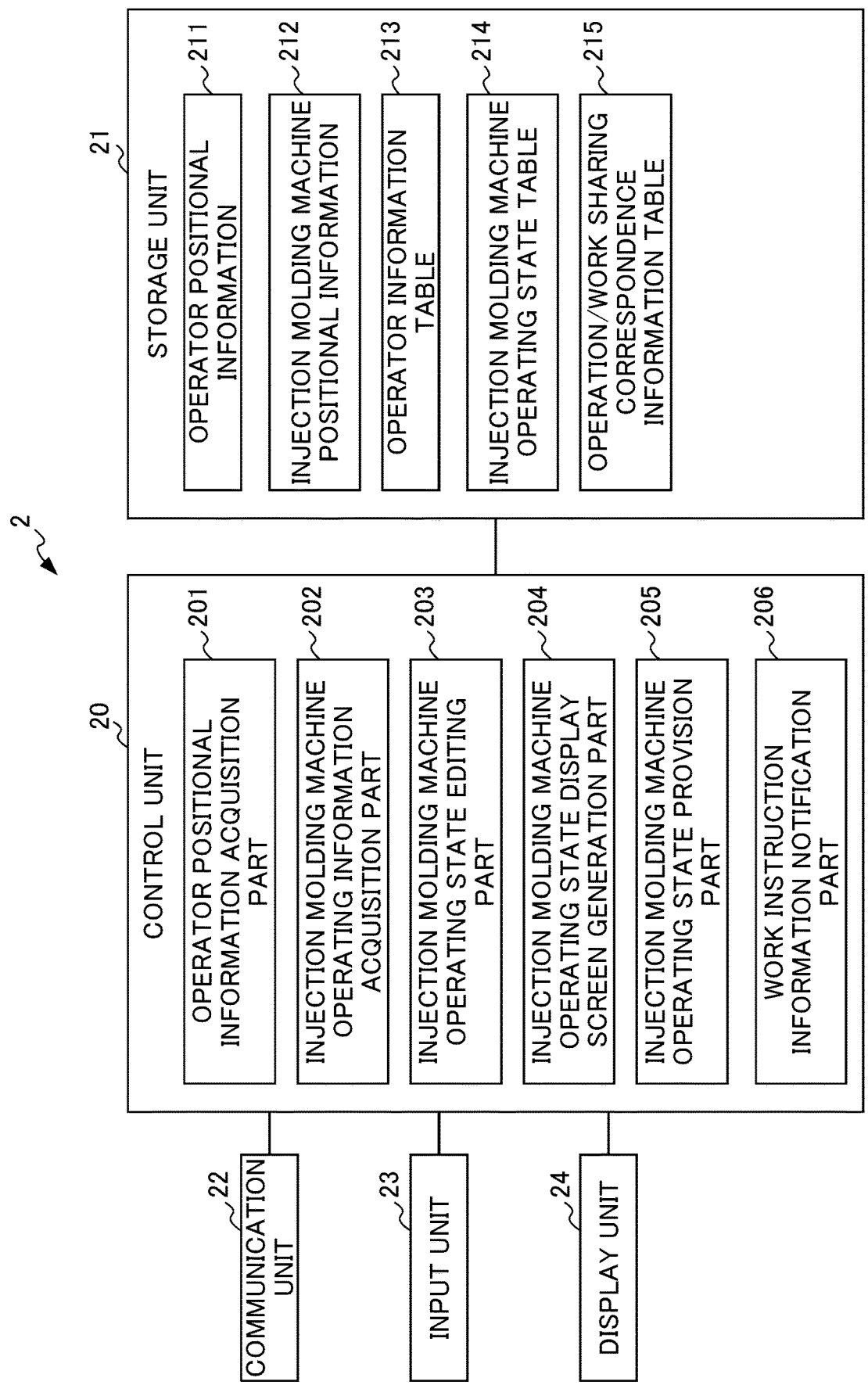
FIG. 3 is a view showing the configuration of a server terminal according to the first embodiment.

As shown in FIG. 3, the server terminal 2 includes a control unit 20, a storage unit 21, a communication unit 22, an input unit 23 and a display unit 24.

The control unit 20, by executing each program read from the storage unit 21, causes the control unit 20 to function as a predetermined functional unit (called "injection molding machine management unit"). As shown in FIG. 3, the control unit 20 (injection molding machine management unit) includes an operator positional information acquisition part 201, injection molding machine operating information acquisition part 202, injection molding machine operating state editing part 203, injection molding machine operating state display screen generation part 204, injection molding machine operating state provision part 205, and work instruction information notification part 206.

The operator positional information acquisition part 201 acquires operator positional information 211 of an operation within the molding factory, based on operator ID information associated with injection molding machine ID information, received from each injection molding machine 1 (operator ID information registration processing part 101) via the communication unit 22. It should be noted that, with the operator positional information acquisition part 201, the operator positional information 211 of an operator not inputting operator ID information to any injection molding machine 1 is evaluated as an operator not performing work. More specifically, the operator positional information acquisition part 201 acquires the position of this injection molding machine 1 as positional information of operators within the molding factory. By configuring in this way, the server terminal 2 can inexpensively and easily acquire positional information of operators, without especially adding new equipment.

The injection molding machine operating information acquisition part 202 acquires the injection molding machine operating information 212 of each injection molding machine 1. More specifically, the injection molding machine operating information acquisition part 202 acquires injection molding machine operating information for every respective injection molding machine 1 along with the operating time information thereof, by receiving this injection molding machine operating information with the injection molding machine ID information as a key along with the operating time information thereof, from the respective injection molding machines 1 (injection molding machine operating information upload part 102) serving as the management targets of the server terminal 2, via the communication unit 22.

The injection molding machine operating state editing part 203 edits the injection molding machine operating state based on the injection molding machine positional information 212 of each injection molding machine 1 stored in advance in the storage unit 21, an operator information table 213 including the operator ID information of all operators who can be assigned operation of each injection molding machine 1 stored in advance in the storage unit 21, operator ID information and operator positional information of operators acquired by the operator positional information acquisition part 201, and injection molding machine operating information of each injection molding machine 1 acquired by the injection molding machine operating information acquisition part 202. Herein, it may be configured so as to further store qualification information, work allocation information, etc. of operators in the operator information table 213. FIG. 4 shows an example of the qualification information, work allocation information, etc. for every operator stored in the operator information table 213.

FIG. 5 shows an example of injection molding machine operating state information (hereinafter also referred to as "injection molding machine operating information table 214") edited by the injection molding machine operating state editing part 203. In FIG. 5, i in the variable $P(i,j)$ represents a number assigned in order from 1 to the injection molding machine 1 serving as the management target of the server terminal 2, and j represents a number assigned in order from 1 to all operators included in the operator information table 213. It should be noted that i ($1 \leq i \leq m$) and j ($1 \leq j \leq n$) are associated in advance 1:1 between the injection molding machine ID information and operator ID information, respectively. Hereinafter, for simplicity, the $i^{th}$ ($1 \leq i \leq m$) injection molding machine is referred to as injection molding machine number i. In addition, the $j^{th}$ ($1 \leq j \leq n$) operator is referred to as operator j. Herein, m indicates the number of injection molding machines 1 serving as the management targets of the server terminal 2, and n indicates the number of operators (i.e. number of all operators that operate an injection molding machine number i ($1 \leq i \leq m$)) serving as the management targets of the server terminal 2.

P(i,j) indicates the state of whether an operator j ($1 \leq j \leq n$) is performing work at the injection molding machine number i ($1 \leq i \leq m$). As one example, in the case of an operator j performing work at the injection molding machine number i within the molding factory, it is P(i,j)=1, and in the case of an operator j not performing work at the injection molding machine number i, it is P(i,j)=0. For example, in the case of an operator 1 and operator 3 performing work at the injection molding machine Ser. No. 1, it becomes P(1,1)=1, P(1,2)=0 and P(1,3)=1. In addition, for all of the injection molding machine number i ($1 \leq i \leq m$), it is possible to detect an operator j not performing work by detecting the operators j for which P(i,j) is 0.

S(i) indicates the operating state of injection molding machine number i ($1 \leq i \leq m$). N(i) is the current production number of injection molding machine number i ($1 \leq i \leq m$). In addition, although not illustrated, the scheduled production number of articles produced by injection molding machine number i ($1 \leq i \leq m$) may be stored as M(i).

L(i) is information of the installation position of an injection molding machine of injection molding machine number i ($1 \leq i \leq m$). As an example, L(i) is the distance from the wall within the molding factor to the position at which injection molding machine number i ($1 \leq i \leq m$) is installed, and in the case of injection molding machines being installed side by side, it may be configured so as to store values such as the column number of the column in which the injection molding machine number i is installed, and the row number from the beginning of each column, for example.

The injection molding machine operating state display screen generation part 204 generates an injection molding machine operating state display screen so as to be able to display the injection molding machine operating state information of each injection molding machine number i ($1 \leq i \leq m$) on the same screen of the display unit 34 of the client terminal 3, based on the injection molding machine operating state table 214 edited by the injection molding machine operating state editing part 203. Upon doing so, it configures so as to also display operator information not performing work on the injection molding machine operating state display screen. By configuring in this way, a factory manager can understand at a glance the arrangement position of each injection molding machine number i and the position of each operator j within the molding factory, by way of observing the display screen on the client terminal 3 described later (or server terminal 2). Then, even if assuming that work were necessary at injection molding machine number i at which an operator is not present, it is possible to find an operator j performing work nearest the injection molding machine number i requiring work, and perform a work instruction to this operator j, for example.

In addition, the injection molding machine operating state display screen generation part 204 may be configured so as to list side by side qualification information and work allocation information of this operator j with the positional information of the operator j, upon generating the injection molding machine operating state display screen, based on the injection molding machine operating state table 214. By configuring in this way, in the case of work A being required at injection molding machine number i at which an operator is not present, for example, it becomes possible for the factory manager find an operator j performing work nearest the injection molding machine number i, and having the qualification information and work allocation information that can handle this work A, and perform a work instruction for injection molding machine number i to this operator j.

As a display screen generated by the injection molding machine operating state display screen generation part 204, for example, it is possible to configure so as to realize in HTML, in the case of a Web server being installed to the server terminal 2, and a Web browser being installed to the client terminal 3. In addition, it may be configured so that the server terminal 2 includes a display unit 24, as well as including a client terminal function. In this case, the number of client terminals 3 may be set as zero.

FIG. 6 shows an example of an injection molding machine operating state display screen created based on the injection molding machine operating state table 214. It should be noted that, although the number of operators performing work at the respective injection molding machine number i ($1 \leq i \leq 6$) is one person for each, in a case assuming that a plurality of operators are working at the injection molding machine number i ($1 \leq i \leq 6$), it may generate a display screen so as to display all of the operators performing the work. In addition, it may generate a display screen so as to display the qualification information and work allocation information of this operator j in the positional information of the operator j.

The injection molding machine operating state provision part 205 provides the injection molding machine operating state display screen generated by the injection molding machine operating state display screen generation part 204 to the client terminal 3 via the communication unit 22, in response to an operating state provision request for the injection molding machine 1 from the client terminal 3.

The work instruction information notification part 206 detects whether a predetermined state is not occurring at injection molding machine number i at which nobody is performing work, based on the injection molding machine operating state table 214 edited by the injection molding machine operating state editing part 203. Herein, predetermined state indicates a state in which an alarm is occurring at injection molding machine number i or a state in which injection molding machine number i comes to be stopped, for example. The work instruction information notification part 206 configures so as to notify a handling instruction for the injection molding machine number i to the factory manager, when detecting that a predetermined state has occurred at the injection molding machine number i at which nobody is performing work. It should be noted that, as the notification method, it may be configured so as to display this event on the client terminal 3. In addition, it may be configured to notify a handling instruction for the injection molding machine number i, via the communication unit 22, for example, to a mobile terminal (wireless terminal) carried by the factory manager.

By configuring in this way, in the case of work A becoming necessary at the injection molding machine number i, it becomes possible for the factory manager to understand at a glance the arrangement position of each injection molding machine number i and the position of each operator j within the molding factory, then find an operator performing work nearest the injection molding machine number i, who can handle the work A, and perform a work instruction to this operator.

In addition, the work instruction information notification part 206 may configure so as to, if detecting that a predetermined state (for example, alarm occurrence state) has occurred at an injection molding machine number i at which nobody is performing work, detect an operator j doing work in the vicinity of this injection molding machine number i, and notify a handling instruction for the injection molding machine number i to the factory manager along with detection information. In addition, the work instruction information notification part 206 may configure so as to directly notify handling instruction information for the injection molding machine number i to the operator j via the communication unit 22. In this case, by setting information associating the qualification information, work sharing information, etc. of a required operator for every predetermined state (for example, alarm occurrence state) in advance (hereinafter referred to as "operation/work sharing correspondence information table 215") in the storage unit 21, the work instruction information notification part 206 may configure so as to detect a qualified operator for this work based on the operator information table 213 and operation/work sharing correspondence information table 215.

The notification method can adopt a known notification method, such as email, Twitter (registered trademark) or LINE (registered trademark), for example. For example, it is preferable to configure so as to perform by way of a push system to a mobile terminal (wireless terminal) carried by the operator j. By configuring in this way, in the case of work becoming necessary at an injection molding machine number i at which an operator is not present, even in a case of the factory manager not being present, it is possible to quickly handle by automatically notifying the handling instruction information to an operator performing work in the vicinity of the injection molding machine number i.

As mentioned earlier, each program for causing the control unit 20 to function as the injection molding machine management unit is stored in the storage unit 21. In addition, operator positional information 211 of operators acquired by the operator positional information acquisition part 201 is stored therein. Furthermore, as mentioned earlier, the injection molding machine positional information 212 related to the installation position of the injection molding machine number i ($1 \leq i \leq m$) is stored in advance in the storage unit 21 to be associated with injection molding machine ID information. Moreover, the operator information table 213 which includes operator ID information related to operators j ($1 \leq j \leq n$) who can be assigned operation of the injection molding machine number i ($1 \leq i \leq m$) is stored in the storage unit 21, as mentioned earlier. In addition, the injection molding machine operating information table 214 edited by the injection molding machine operating state editing part 2013 is stored in the storage unit 21, as mentioned earlier. Furthermore, as mentioned earlier, the operation/work sharing correspondence information table 215 associating the required qualifications, work sharing information, etc. of operators for every predetermined state (for example, alarm occurrence state) can be stored in the storage unit 21.

(Regarding Client Terminal)

Figure 7:
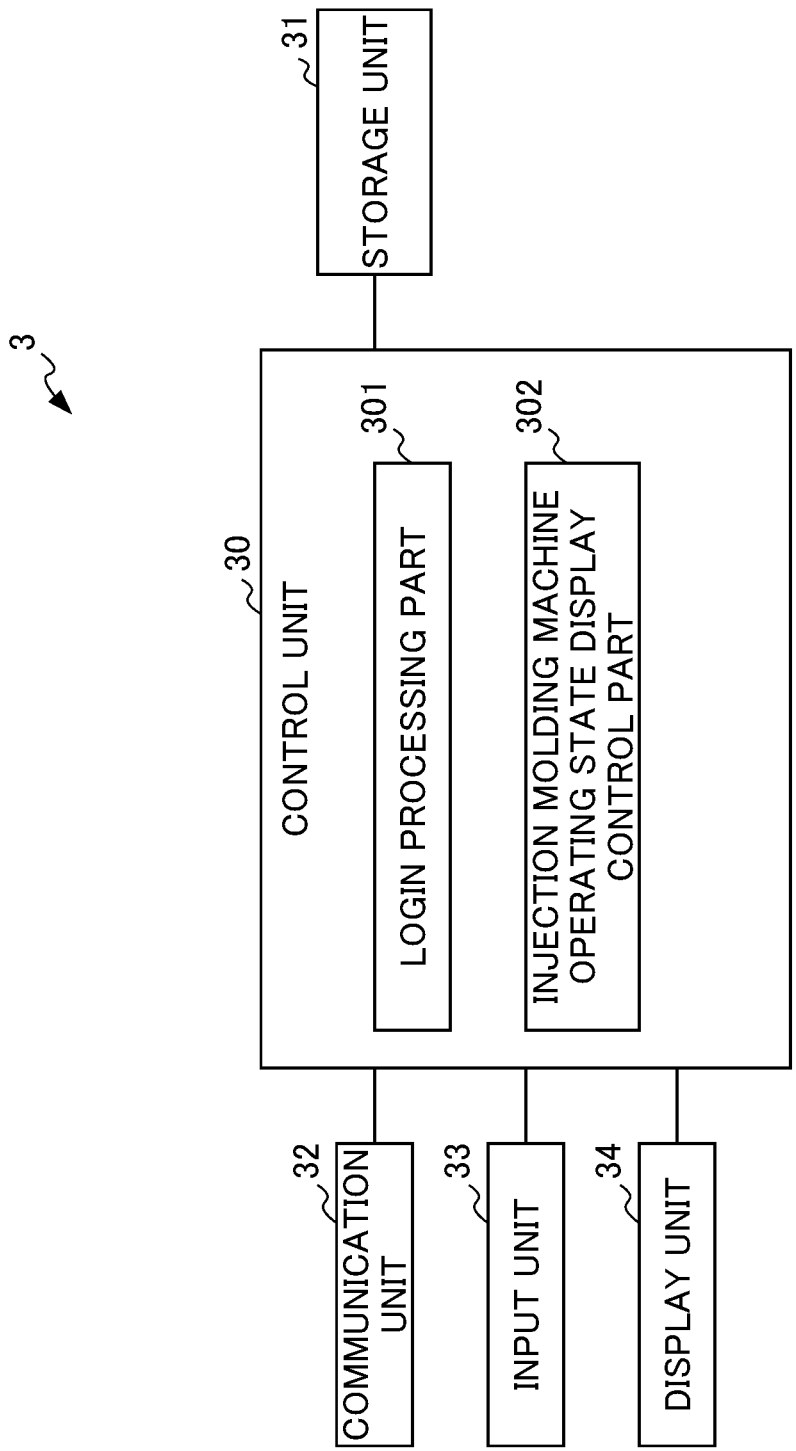
FIG. 7 is a view showing the configuration of a client terminal according to the first embodiment.

As shown in FIG. 7, the client terminal 3 includes a control unit 30, a storage unit 31, communication unit 32, an input unit 33 and a display unit 34, similarly to the server terminal 2.

The control unit 30, by executing each program read from the storage unit 31, allows the control unit 30 to function as a predetermined functional unit (called "injection molding machine operating state display unit"). As mentioned earlier, in order to display on the display unit 34 the information of the installation position of the injection molding machine 1, positional information of operators and injection molding machine operating state as shown in FIG. 6, the control unit 30 (injection molding machine operating state display unit) includes a login processing part 301 and an injection molding machine operating state display control part 302 as shown in FIG. 7.

The login processing part 301 executes login processing to the server terminal 2 for a user using the client terminal 3, user authentication is made, and performs connection processing with the server terminal 2.

The injection molding machine operating state display control part 302 sends a state provision request for the injection molding machine 1 to the server terminal 2, and receives data of an injection molding machine operating state table generated by the injection molding machine operating state display screen generation part 204 from the server terminal 2 (injection molding machine operating state provision part 205). The injection molding machine operating state display control part 302 displays the injection molding machine operating state display screen shown in FIG. 6 on the same screen of the display unit 34, based on the received data of the injection molding machine operating state table. It should be noted that, as mentioned earlier, it is possible to display together the qualifications and work sharing information of the operator with the positional information of the operator displayed on the client terminal 3. By configuring in this way, in the case of an injection molding machine requiring work arising, the factory manager can determine if a qualified operator to perform the work, and perform a work instruction to the qualified operator.

Operation of the injection molding machine operating state display control part 302 will be explained by referencing FIG. 6. The installation positions of six of the injection molding machines 1 are displayed on the injection molding machine operating state display screen shown in FIG. 6, and the operating state, production number, etc. of each injection molding machine is displayed. It is thereby possible for the factory manager to understand the operating states of injection molding machines 1 at a glance. Furthermore, when referencing FIG. 6, the positional information of operators is displayed on the same screen. By configuring in this way, it is possible to understand at a glance through the display screen that operators A and B are present at the positions of injection molding machine numbers 2 and 6, while no operator is present despite machine number 4 being during stop. From this, the factory manager may find the operator performing work closest to machine number 4 on the screen and instruct handling of machine number 4. In the case of FIG. 5, the factory manager can get in touch with operator A perform work at machine number 2, for example, the mobile terminal carried by operator A.

Effects of First Embodiment

In the above way, according to the first embodiment, a display screen is generated for simultaneously displaying arrangement positions of each injection molding machine 1 and the work positions of each operator within a molding factory. From this, since it is possible to understand at a glance in real-time the operating state of each injection molding machine 1 and position of each operator within a molding factory, the factory manager can release the appropriate work instruction of an operator by considering the operating state of each injection molding machine 1.

In addition, by adopting a means for inputting operator ID information to the injection molding machine 1 by way of a conventionally known password, IC card or the like as the means for acquiring positional information of operators as in the first embodiment, it is possible to realize the present invention inexpensively and simply, without requiring to prepare a special device for understanding the positions of operators.

According to the first embodiment, a display screen is generated for simultaneously displaying the operating information of each injection molding machine within a molding factory, with the arrangement positions of these injection molding machines and positional information of each operator. From this, in the case of work becoming required at an injection molding machine, the factory manager can understand at a glance the arrangement position of each injection molding machine and position of each operator within the molding factory, find an operator performing work nearest the injection molding machine for which work became necessary, and perform a work instruction.

According to the first embodiment, work instruction information for an operator is outputted based on injection molding machine operating state information of the injection molding machine 1, operator positional information of an operator, and positional information of the injection molding machine 1. From this, in the case of work becoming necessary at an injection molding machine at which an operator is not present, it is possible to quickly handle by notifying handling instruction information to an operator performing work in the vicinity of the injection molding machine number i.

Second Embodiment

Next, an injection molding machine management system 100A according to a second embodiment of the present invention will be explained. In the second embodiment, mainly the points of difference from the first embodiment will be explained. For this reason, the same reference numbers are assigned for configurations identical (or equivalent) to the first embodiment, and detailed explanations thereof are omitted. In addition, for points not particularly explained in the present embodiment, the explanation in the first embodiment is applied as appropriate. In addition, unless particularly refuted, the same effects as the first embodiment are exerted in the second embodiment.

The second embodiment differs from the first embodiment in the point of including a position detection system 400 that measures the positions of operators within the molding factory, and acquiring positional information of operators by way of the position detection system 400.

Figure 8A:
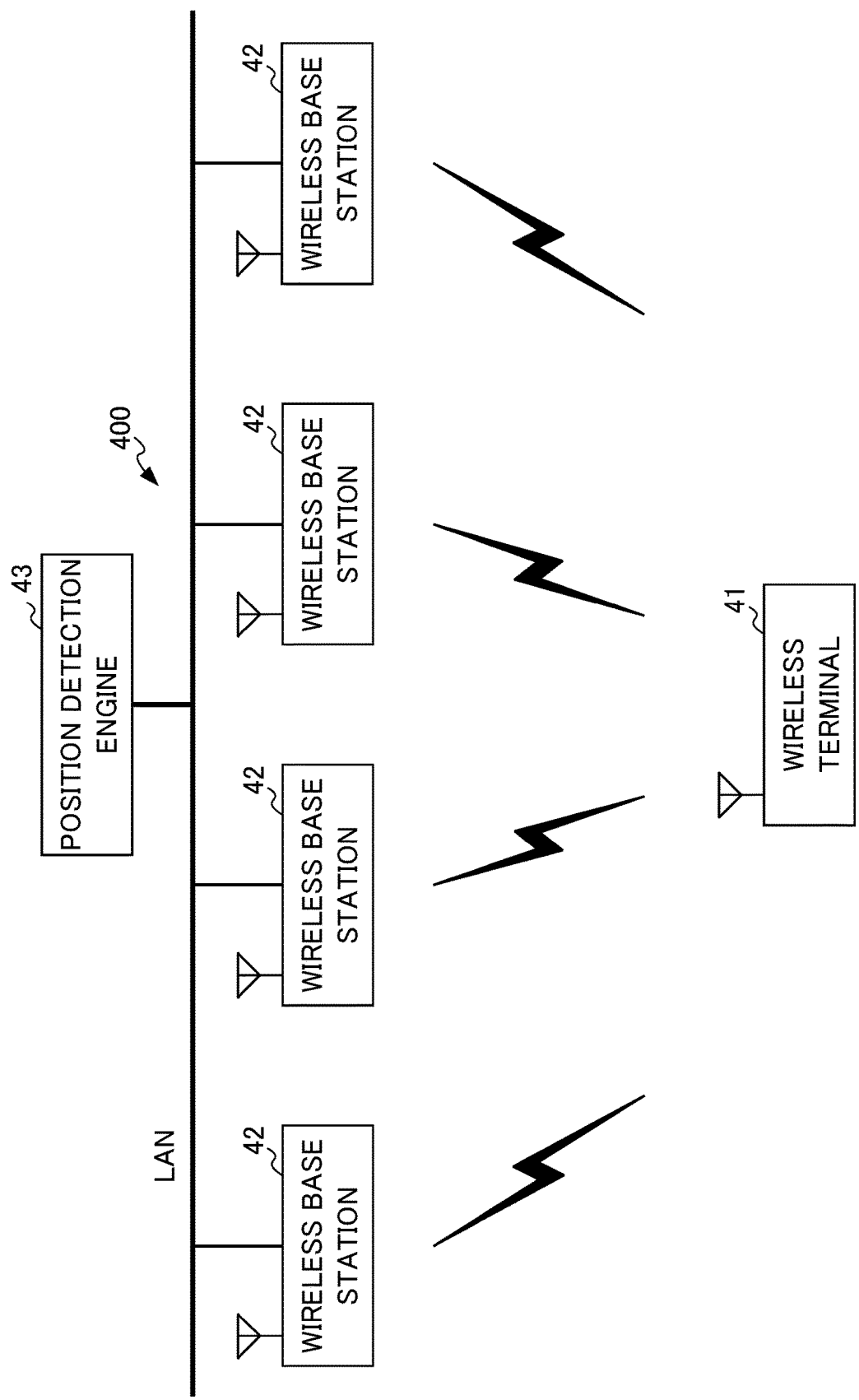
FIG. 8A is a view showing the configuration of a position detection system 400 according to a second embodiment.

It is possible to use well-known technology as the position detection system 400. For example, as shown in FIG. 8A, it is possible to configure so as to include a position detection engine 43 that receives radio waves sent from wireless terminals 41 such as the mobile terminal by a plurality (for example, 4) of wireless receivers (also referred to as "wireless base stations"), and specifies the positions of the wireless terminals 41, based on triangulation from the differences in the radio-wave arrival times at which reaching each of the wireless base stations 42 (radio-wave arrival time difference scheme). In addition, it may be configured so as to include a position detection engine 43 that receives radio waves sent from a wireless terminal 41, and specifies the position of the wireless terminal 41 based on the intensity of radio waves received from the wireless terminal, and a radio-wave intensity map acquired in advance or triangulation (radio-wave intensity scheme). In addition, a beacon scheme may be applied. In this case, by way of a beacon unit installed within the molding factory, it may be configured so as to acquire operator ID information, as well as measure the positions of operators, by receiving radio waves, infrared rays or the like emitted from a beacon carried by the operator. It should be noted that, as the beacon and beacon unit, for example, RFID (Radio Frequency Identification), Bluetooth (registered trademark), etc. can be exemplified. In this way, the injection molding machine management system 100A according to the second embodiment can detect the positional information of operators within the molding factory, as well as operator ID information, by way of including the well-known position detection system 400.

Figure 8B:
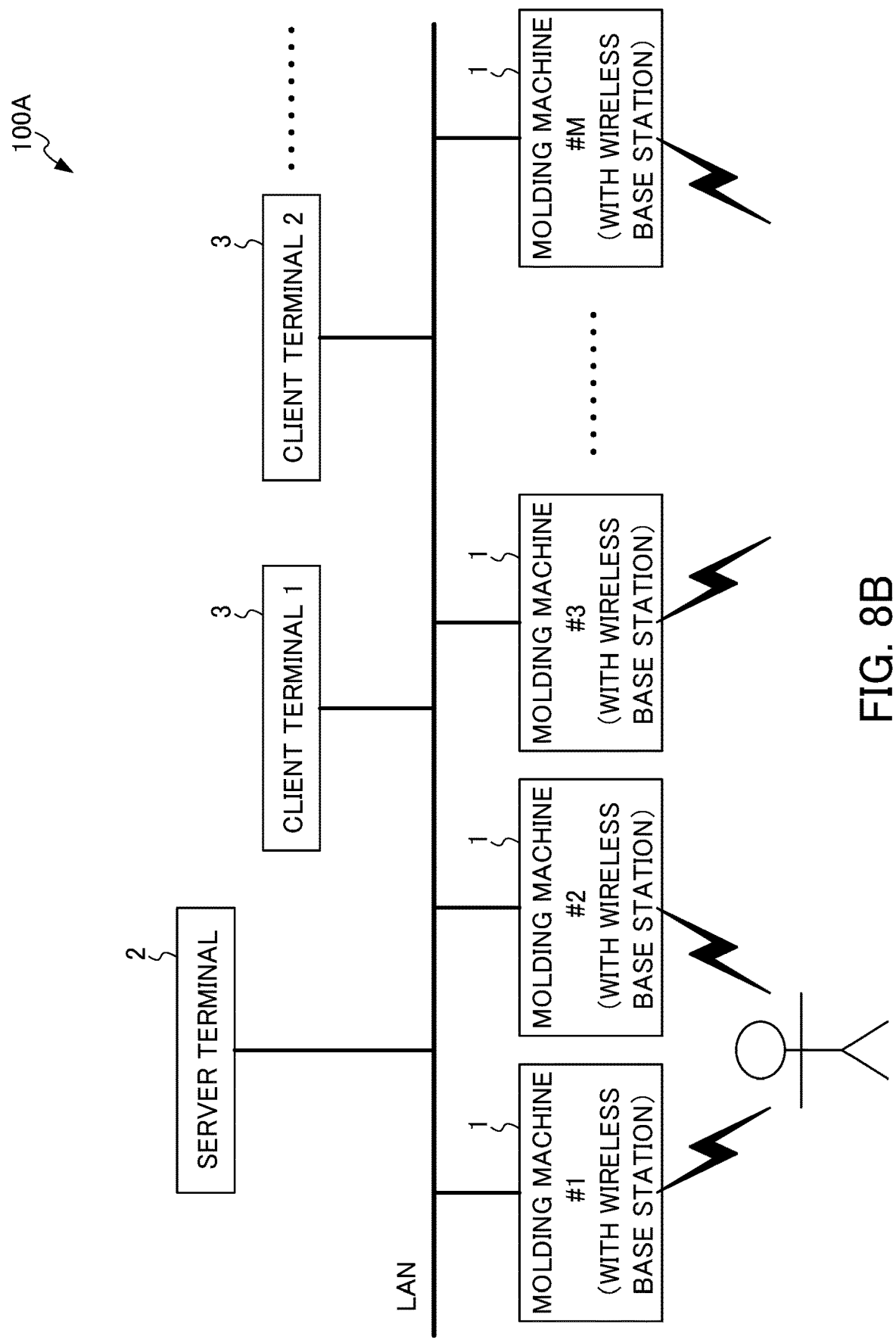
FIG. 8B is a view showing an example of the position detection system 400 according to the second embodiment.
Figure 8C:
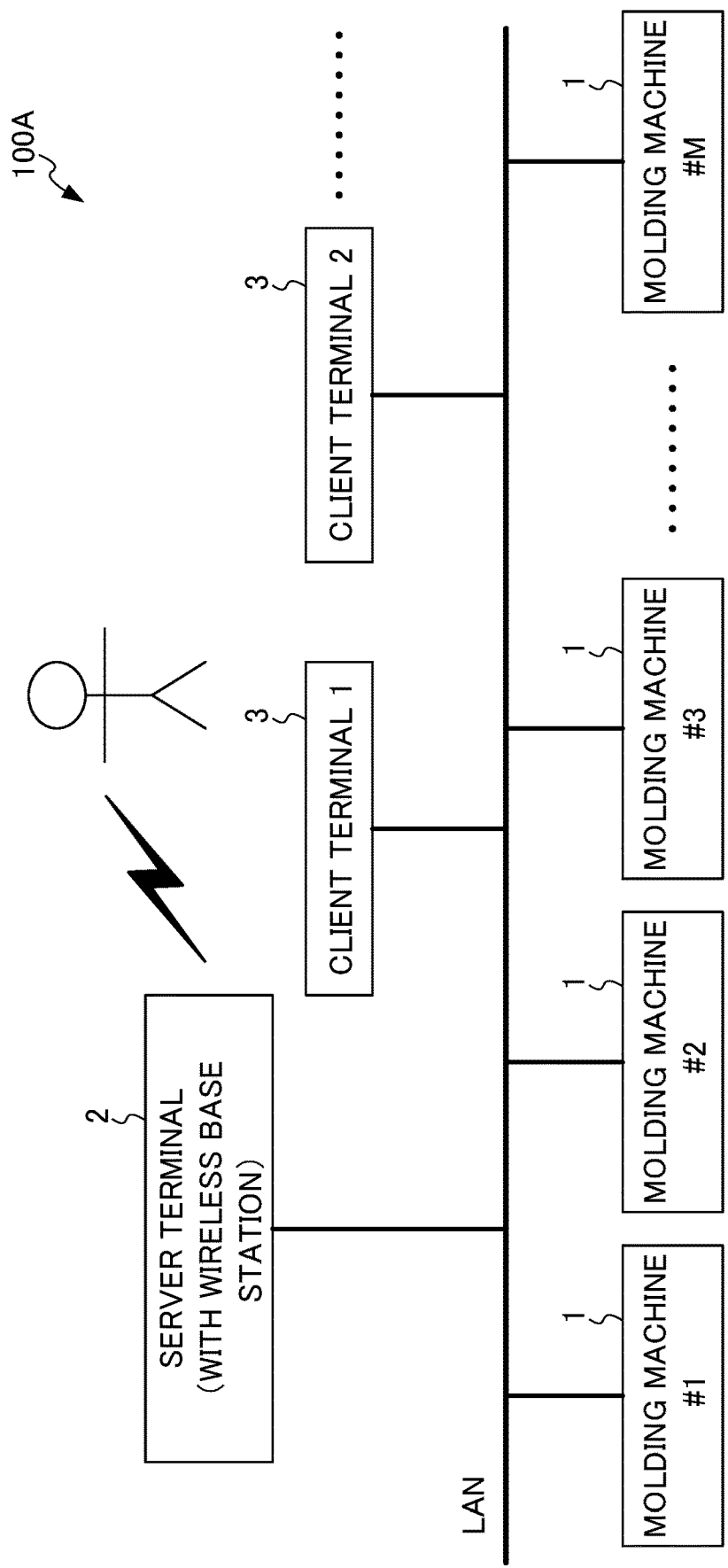
FIG. 8C is a view showing an example of the position detection system 400 according to the second embodiment.

In the second embodiment, it is premised that the well-known position detection system 400 is provided in advance. Upon using the position detection system 400, each user carries the wireless terminal 41, the wireless base stations 42 are installed at locations where the position coordinates within the molding factory are already known, and a position detection server (provisional name) including the position detection engine 43 is provided. In the second embodiment, the server terminal 2 acquires the positional information of each operator from the position detection engine 43. It should be noted that the wireless base station 42 may be installed at the injection molding machine 1, as shown in FIG. 8B. As shown in FIG. 8C, the wireless base station 42 may be installed at the server terminal 2. In addition, the position detection engine 43 may be configured to be included by the server terminal 2. In addition, it may be provided as a virtual server on a cloud.

(Regarding Injection Molding Machine)

Figure 9:
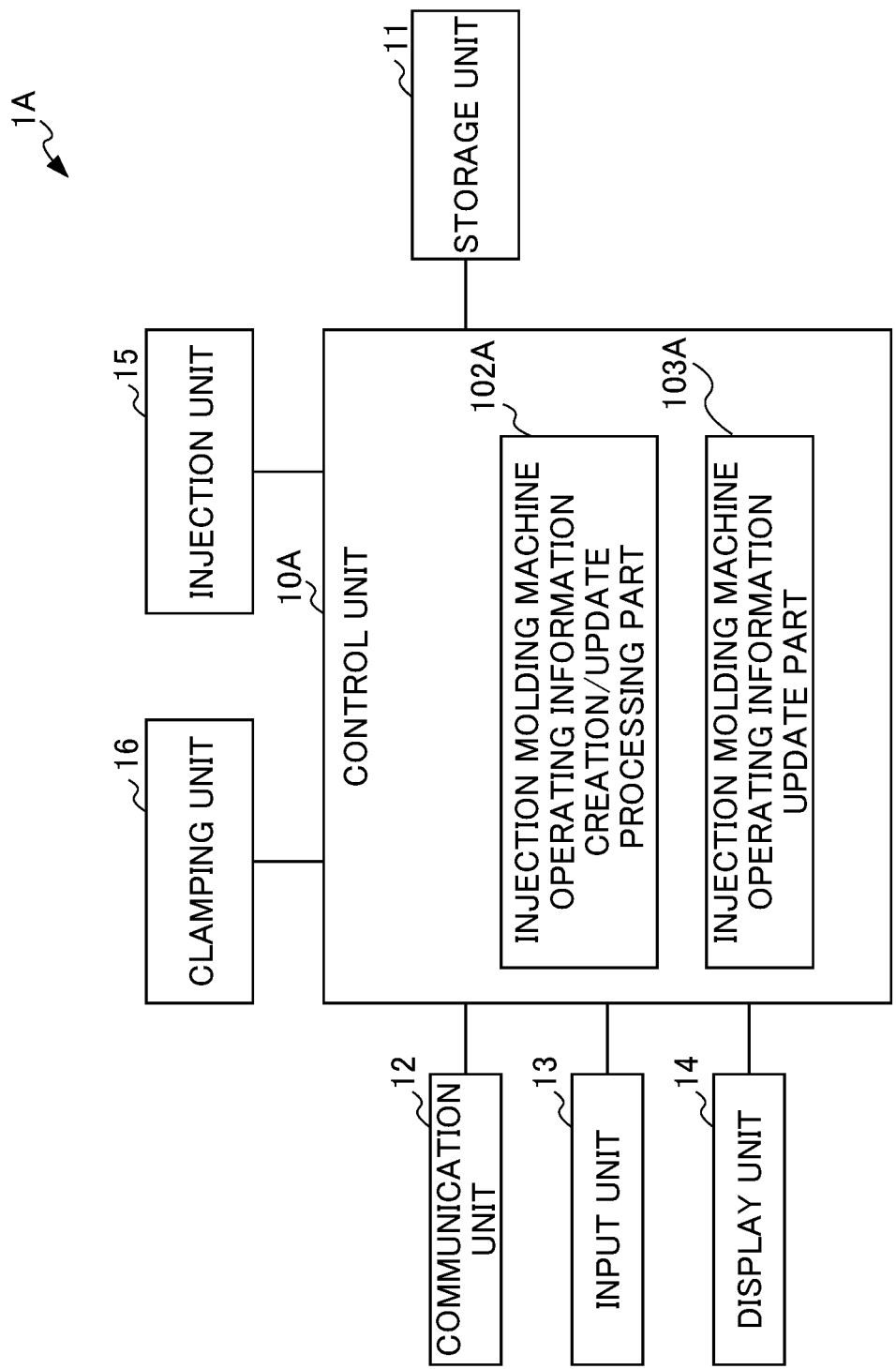
FIG. 9 is a view showing the configuration of an injection molding machine according to the second embodiment.

As shown in FIG. 9, the injection molding machine 1A can include a control unit 10A, a storage unit 11, a communication unit 12, an input unit 13, and a display unit 14, similarly to the first embodiment. Among the functions possessed by the control unit 10 in the first embodiment, the control unit 10A possessed by the injection molding machine 1 does not include the operator ID information registration processing part 101. The control unit 10A, in addition to well-known functional units of the injection molding machine 1 such as the sequence control part (not illustrated), motion axis control part (not illustrated) and servo control part (not illustrated), includes an injection molding machine operating information creation/update processing part 102A and an injection molding machine operating information upload part 103A.

Among the functions possessed by the injection molding machine operating state creation/update part 102 in the first embodiment, the injection molding machine operating information creation/update processing part 102A includes all of the functions except for the creation/update function for operator information of injection molding machine number i (in the case of operator j performing work at this injection molding machine number i, the operator ID information of this operator j; in the case of nobody performing work, information of the fact that no operator is present as the operator ID information).

The injection molding machine operating information upload part 103A sends, to the server terminal 2 via the communication unit 12, injection molding machine operating information of this injection molding machine (excluding operator information of the injection molding machine) created/updated by the injection molding machine operating information creation/update processing part 102A. Therefore, the injection molding machine operating information upload part 103A does not send operator information of the injection molding machine number i (in the case of operator j performing work at this injection molding machine number i, the operator ID information of this operator j; in the case of nobody performing work, information of the fact that no operator is present as the operator ID information) to the server terminal 2.

(Regarding Server Terminal 2)

Figure 10:
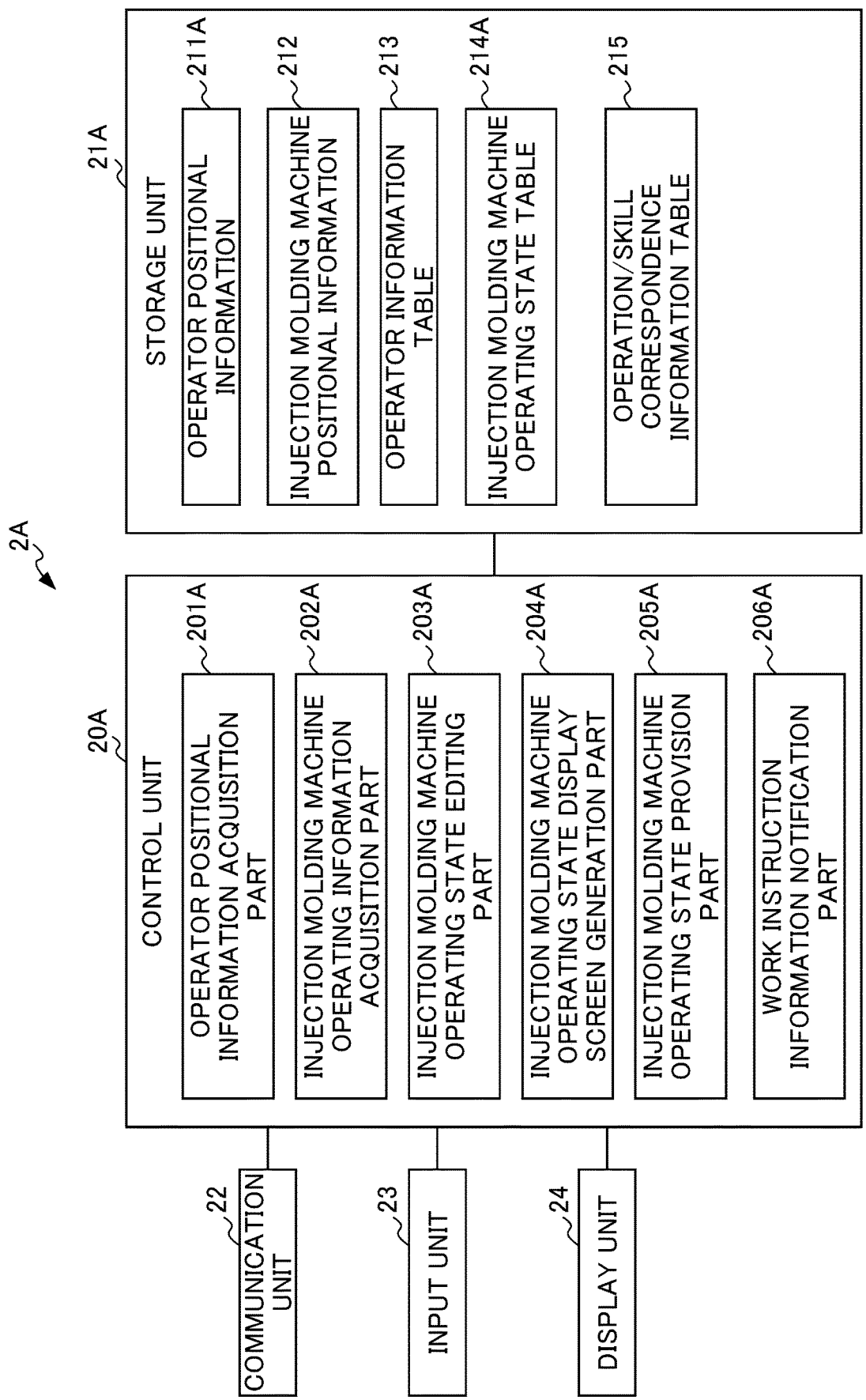
FIG. 10 is a view showing the configuration of a server terminal according to the second embodiment.

As shown in FIG. 10, the control unit 20A possessed by the server terminal 2 includes an operator positional information acquisition part 201A, an injection molding machine operating information acquisition part 202A, an injection molding machine operating state editing part 203A, an injection molding machine operating state display screen generation part 204A, an injection molding machine operating state provision part 205A, and a work instruction information notification part 206A.

The operator positional information acquisition part 201A, as mentioned earlier, acquires operator positional information 211A of each operator from the position detection engine 43 via the communication unit 22. Herein, operator positional information 211A of each operator is the positional coordinates of each operator. The operator positional information acquisition part 201A stores the acquired positional coordinates of an operator as the operator positional information 211A in the storage unit 21A. FIG. 11 shows an example of the operator positional information 211A stored in the storage unit 21A. In FIG. 11, POS(j) are the positional coordinates of the operator j, and is shown on the same coordinate system as the positional coordinates $L2(i)$ of the injection molding machine number i.

The injection molding machine operating information acquisition part 202A can acquire the injection molding machine operating information for every respective injection molding machine 1 along with the operating time information thereof, by receiving this injection molding machine operating information with the injection molding machine ID information as a key along with the operating time information thereof, from each injection molding machine 1 (injection molding machine operating information upload part 103A) serving as the management target of the server terminal 2, via the communication unit 22. It should be noted that the injection molding machine operating information acquisition part 202A does not acquire operator information of the injection molding machine number i (in the case of operator j performing work at this injection molding machine number i, the operator ID information of this operator j; in the case of nobody performing work, information of the fact that no operator is present as the operator ID information).

The injection molding machine operating state editing part 203A edits the injection molding machine operating state table 214A, based on the injection molding machine positional information 212 of each injection molding machine 1 stored in advance in the storage unit 21A, the operator information table 213 including the operator ID information of all operators that can be assigned operation of the respective injection molding machines 1 stored in advance in the storage unit 21A, the operator ID information and operator positional information 211A of operators acquired by the operator positional information acquisition part 201A, and injection molding machine operating information 212 of each injection molding machine 1 acquired by the injection molding machine operating information acquisition part 202A.

FIG. 11 shows an example of the injection molding machine operating state information ("injection molding machine operating state table 214A") edited by the injection molding machine operating state editing part 203A. As shown in FIG. 11, the injection molding machine operating state table 214A includes the injection molding machine operating information table 214A1 and operator positional information 211A.

The variables S(i), N(i) and $L2(i)$ in the injection molding machine operating information table 214A represent the operating state, production number and positional information of injection molding machine number i ($1 \leq i \leq m$), and are the same as the variables S(i), N(i) and L(i) in the first embodiment, respectively. In addition, similarly to the first embodiment, the scheduled production number of article to be produced by the injection molding machine number i ($1 \leq i \leq m$) may be stored as M(i) (not illustrated).

The variable POS(j) in the operator positional information 211A is positional information of the operator j, as mentioned earlier, and is shown in the same coordinate system as the positional information $L2(i)$ of the injection molding machine number i. In this way, the difference in contents between the injection molding machine operating information in FIGS. 5 and 11 is based on the difference arising form the acquisition means of the operator positional information.

The injection molding machine operating state display screen generation part 204A generates an injection molding machine operating state display screen so as to be able to display the injection molding machine operating state information of each injection molding machine number i ($1 \leq i \leq m$) on the same screen of the display unit 34 of the client terminal 3, based on the injection molding machine operating state table 214A edited by the injection molding machine operating state editing part 203A. At this time, it is configured so as to display operators j ($1 \leq j \leq n$) at positions on the coordinates within the molding factory, based on the operator positional information, on the injection molding machine operating state display screen. By configuring in this way, the factory manager can understand at a glance the arrangement positions of each injection molding machine number i and the position of each operator j within the molding factory, by observing the display screen on the client terminal 3 described later (or server terminal 2). Then, even assuming a case in which work becomes required at the injection molding machine number i at the position of operator j, it is possible to find the operator j performing work nearest the injection molding machine number i, and perform a work instruction to this operator j.

In addition, the injection molding machine operating state display screen generation part 204A may be configured so as to list side-by-side the qualification information and work sharing information of an operator j at the position of this operator j, upon generating the injection molding machine operating state display screen, similarly to the first embodiment. Alternatively, the injection molding machine operating state display screen generation part 204A may be configured so as to display the qualification information and work sharing information of an operator j at the position of this operator j. By configuring in this way, even assuming a case of work A becoming necessary at the injection molding machine number i at the position of the operator j, for example, the factory manager is able to find an operator j performing work nearest the injection molding machine number i, and having the qualification information and work sharing information capable of handling this work A, and perform a work instruction for the injection molding machine number i to this operator j.

As the display screen generated by the injection molding machine operating state display screen generation part 204A, it is possible to configure so as to realize in HTML, similarly to the first embodiment. In addition, similarly to the first embodiment, it may be configured so that the server terminal 2 includes a display unit 24, as well as including a client terminal function. In this case, the number of client terminals 3 may be zero.

FIG. 12 shows an example of the injection molding machine operating state display screen created based on the injection molding machine operating state table 214A. As shown in FIG. 12, the installation position of each injection molding machine number i ($1 \leq i \leq m$) and the positional relationship of each operator j ($1 \leq j \leq n$) within the molding factory are displayed in the second embodiment. In addition, similarly to the first embodiment, a display screen may be generated so as to display the qualification information and work sharing information of an operator j in the positional information of this operator j. Alternatively, the injection molding machine operating state display screen generation part 204A may be configured so as to display the qualification information and work sharing information of an operator j at the position of this operator j. By configuring in this way, the factory manager is able to determine whether a qualified operator for the required work is performing in the case of an injection molding machine requiring work arising. In addition, it is possible to perform a work instruction to a qualified operator. The factory manager is able to understand at a glance the arrangement position of each injection molding machine and the position of each operator within the molding factory, find an operator performing work nearest the injection molding machine requiring work, and perform a work instruction, for example.

The injection molding machine operating state provision part 205A, in response to an operating state provision request for the injection molding machines 1 from the client terminal 3, provides data of the injection molding machine operating state table generated by the injection molding machine operating state display screen generation part 204A to the client terminal 3 via the communication unit 22.

Similarly to the first embodiment, it may be configured so that when the work instruction information notification part 206A detects that a predetermined state (for example, alarm occurrence state) has arisen in the injection molding machine number i, in a case of no operator being present within a work area set in advance of the injection molding machine number i, it detects an operator j doing work in the vicinity of this injection molding machine number i, and notifies a handling instruction for the injection molding machine number i along with detection information to the factory manager. In addition, the work instruction information notification part 206A may be configured so as to directly notify the handling instruction information of the injection molding machine number i to the operator j via the communication unit 22, for example, similarly to the first embodiment. In this case, the work instruction information notification part 206A may be configured so as to detect an operator qualified for this work based on the operator information table 213 and operation/work sharing correspondence information table 215, similarly to the first embodiment. In the case of an injection molding machine requiring work arising, the factory manager can thereby determine if an operator qualified for the required work is performing work, and perform a work instruction to the qualified operator.

In addition, the work instruction information notification part 206A may be configured so as to directly notify handling instruction information of the injection molding machine number i to the operator j via the communication unit 22, for example, similarly to the first embodiment. Even in a case of the factory manager not being present, it is thereby possible to quickly handle by automatically notifying the handling instruction information to an operator performing work in the vicinity of the injection molding machine number i.

As mentioned earlier, the respective programs for causing the control unit 20A to function as the injection molding machine management unit are stored in the storage unit 21A. In addition, similarly to the first embodiment, it is possible to store, in the storage unit 21A, the operator positional information 211A, injection molding machine positional information 212, operator information table 213, injection molding machine operating state table 214A edited by the injection molding machine operating state editing part 203A, and operation/work sharing correspondence information table 215.

(Regarding Client Terminal)

The client terminal 3 includes the same configuration as the first embodiment. The control unit 30 (injection molding machine operating state display unit) includes the login processing part 301 and injection molding machine operating state display control part 302, similarly to the case of the first embodiment.

The injection molding machine operating state display control part 302 sends a state provision request for the injection molding machine 1 to the server terminal 2, and receives data of the injection molding machine operating state table generated by the injection molding machine operating state display screen generation part 204A from the server terminal 2 (injection molding machine operating state provision part 205A). The injection molding machine operating state display control part 302 displays the injection molding machine operating state display screen such as that shown in FIG. 12 as an example, on the same screen of the display unit 34, based on the received data of the injection molding machine operating state table.

Operation of the injection molding machine operating state display control part 302 will be explained by referencing FIG. 12. The installation positions of six injection molding machines are displayed on the injection molding machine operating state display screen shown in FIG. 12, and the operating state, production number, etc. of each injection molding machine are displayed. It is thereby possible for the factory manager to understand the operating state of the injection molding machines at a glance. Furthermore, when referencing FIG. 12, the positional information of operators is displayed on the same screen. By configuring in this way, for example, it is possible understand at a glance through the display screen that operators A and B are in the work areas of the injection molding machine numbers 2 and 6, and that no operator is present at the work area despite another machine number 4 being during stop. From this, the factory manager may find an operator performing work nearest the machine number 4 on the screen, and instruct handling of the machine number 4. In the case of FIG. 12, the factory manager can get in touch with operator A performing work at machine number 2, for example, the mobile terminal carried by operator A.

Effects of Second Embodiment

In the above way, similar effects as the first embodiment are exerted according to the second embodiment. Furthermore, according to the second embodiment, the operator positional information acquisition part 201A acquires the operator positional information within the molding factory measured by way of the position detection system 400. Then, qualification and work sharing information of operators are displayed at the positions of the operators. From this, for example, the factory manager is able to determine whether a qualified operator for the required work is performing work in the case of an injection molding machine requiring work arising. In addition, it is possible to perform a work instruction to the qualified operator.

Third Embodiment

Figure 13:
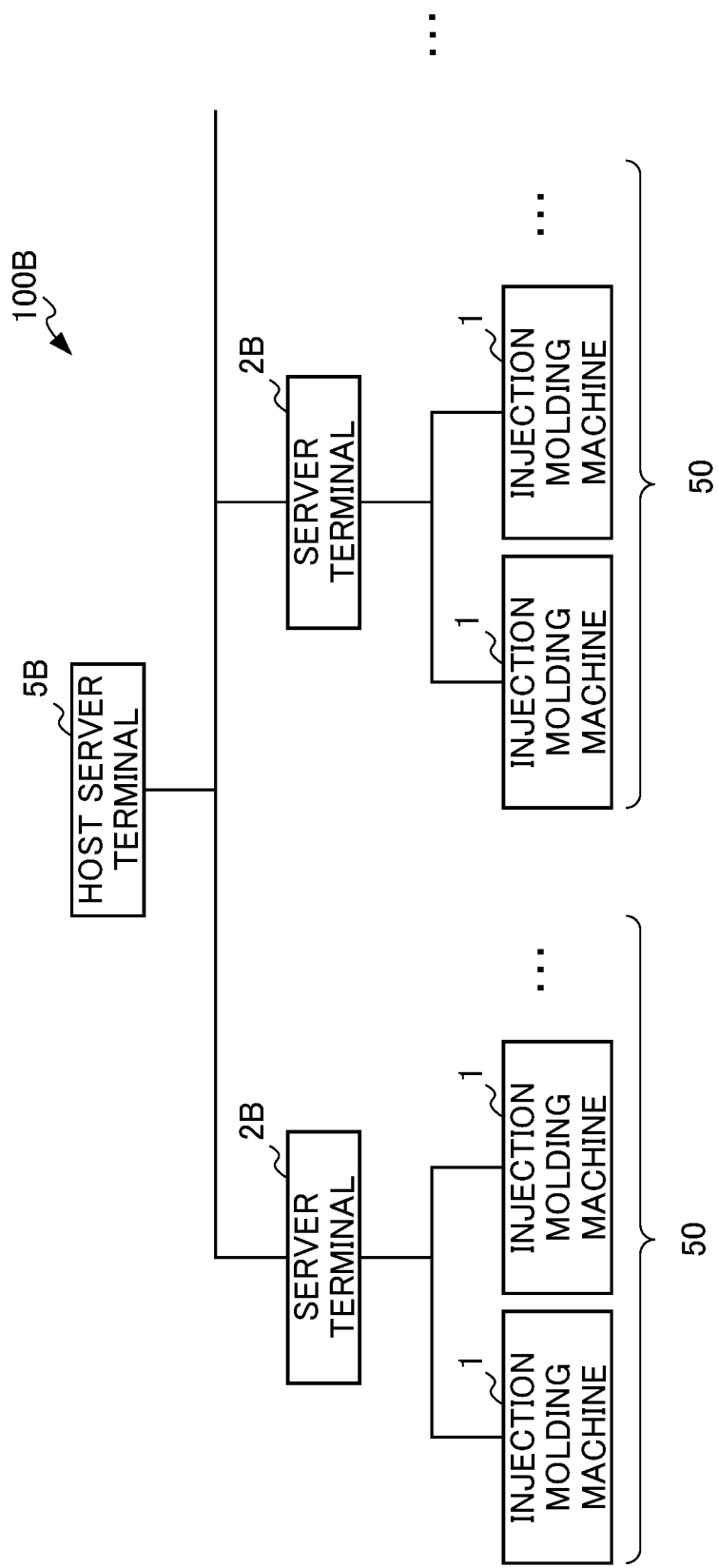
FIG. 13 is a view showing the configuration of an injection molding machine management system according to a third embodiment.

Next, an injection molding machine management system 100B according to a third embodiment of the present invention will be explained while referencing FIG. 13. As shown in FIG. 13, the injection molding machine management system 100B according to the third embodiment includes a plurality of server terminals 2B serving as second server terminals, and includes a server terminal 5B ("host server terminal 5B") serving as a first server terminal than manages this plurality of server terminals 2B. If referring to the plurality of injection molding machines 1 managed by the server terminal 2B as an injection molding machine group 50, the injection molding machine management system 100B includes a plurality of injection molding machine groups 50, and manages the injection molding machines 1 included in the plurality of injection molding machine groups 50 by way of the plurality of server terminals 2B and the host server terminal 5B. In this case, it is preferable to set the injection molding machine group ID information for identifying each injection molding machine group in advance, and configure so that the injection molding machine ID information includes the injection molding machine group ID information. The injection molding machine group 50 is one management unit, and the host server terminal 5B can collectively manage a plurality of these management units (injection molding machine groups 50). For example, in the case of the molding factory being a large-scale factory, it is possible to establish any block unit within the molding factory as the management unit.

The server terminal 2B includes a control unit 20B, a storage unit 21B, a communication unit 22B, an input unit 23B and a display unit 24B, similarly to the server terminal 2. On the other hand, the host server terminal 5B at least includes a control unit 50B, a storage unit 51B and a communication unit 52B.

The server terminal 2B and host server terminal 5B are configured so as to together decentrally include the functions of the injection molding machine management parts (operator positional information acquisition part 201, injection molding machine operating information acquisition part 202, injection molding machine operating state editing part 203, injection molding machine operating state display screen generation part 204, injection molding machine operating state provision part 205 and work instruction information notification part 206) possessed by the control unit 20 of the server terminal 2 according to the first embodiment.

For example, the server terminal 2B may be configured to include the functions corresponding to the operator positional information acquisition part 201 and injection molding machine operating information acquisition part 202 possessed by the server terminal 2, and perform acquisition of information such as ID information of an injection molding machine 2 serving as the management target of the server terminal 2B, operator ID information, operating information of the injection molding machine 2, and production number. On the other hand, the host server terminal 5B may be configured so as to include the functions corresponding to the injection molding machine operating state editing part 203, injection molding machine operating state display screen generation part 204, injection molding machine operating state provision part 205 and work instruction information notification part 206 possessed by the server terminal 2. In other words, it may be configured so as to manage all together the operating information of all of the injection molding machines 1 included in the injection molding machine group 50.

In addition, the server terminal 2B may be configured so as to include the corresponding functions of the injection molding machine management unit possessed by the server terminal 2, and the host server terminal 5B may be configured so as to include functions as a file server that stores data corresponding to the injection molding machine positional information 212, operator information table 213, injection molding machine operating state table 214 and operation/work sharing correspondence table 215, which is stored in the storage unit 21 of the server terminal 2. By configuring in this way, the server terminal 2B can collect data related to the management target and injection molding machine group 50 in the host server terminal 5B without having separately. It should be noted that the distribution of functions of the server terminal 2 is not limited to that described above. How the respective functional parts possessed by the server terminal 2 are distributed may be set as appropriate by the user.

By configuring in this way, the server terminal 2B can collect I/O data in the host server terminal 5B without having separately. The load on the server terminal 2 managing the injection molding machines 1 is reduced, and the efficient collection of information and management at low cost becomes possible, even in a large-scale injection molding factory. In addition, the data maintenance load is reduced. Even assuming a case of changing the management unit, it is possible to reduce the workload related to changing.

Fourth Embodiment

An injection molding machine management system 100C according to a fourth embodiment includes a plurality of server terminals 2C, and includes a host server terminal 5C that manages this plurality of server terminals 2C, similarly to the injection molding machine management system 100B according to the third embodiment. The server terminals 2C and host server terminal 5C are configured so as to together decentrally include the functions of the injection molding machine management part (operator positional information acquisition part 201A, injection molding machine operating information acquisition part 202A, injection molding machine operating state editing part 203A, injection molding machine operating state display screen generation part 204A, injection molding machine operating state provision part 205A, and work instruction information notification part 206A) possessed by the control unit 20A of the server terminal 2A according to the second embodiment. Since it is possible to explain the functions possessed by the server terminals 2C and host server terminal 5C according to the fourth embodiment by reading the explanation of the third embodiment by replacing the term of server terminal 2 with server terminal 2A, server terminal 2B with server terminal 2C, and host server terminal 5B with host server terminal 5C, a detailed explanation thereof will be omitted. In addition, regarding the effects of the injection molding machine management system 100C according to the fourth embodiment, it is possible to exert similar effects as the third embodiment.

Although embodiments of the present invention have been explained above, the present invention is not to be limited to the aforementioned embodiments. In addition, the effects described in the present embodiment are merely listing the most preferred effects produced from the present invention, and the effects according to the present invention are not to be limited to those described in the present embodiment.

Modified Example 1

In the first embodiment and second embodiment, it is configured so as to display the injection molding machine operating state display screen received from the server terminal 2 (injection molding machine operating state provision parts 205 and 205A) on the same screen of the display unit by each of the client terminal 3; however, it may be configured so as to include a server function and client function on one terminal, without establishing the server terminal 2 and client terminal 3 as separate terminals. In other words, the control unit of the server terminal 2 may be configured so as to include the login processing part 301 and injection molding machine operating state display control part 302, respectively. By configuring in this way, it is possible for the factory manager to understand at a glance the operating states of injection molding machines from one terminal.

Modified Example 2

In the first embodiment and second embodiment, although it is configured so as to provide the injection molding machine operating state display screen generation parts 204 and 204A, respectively, to the server terminal 2, and generate an injection molding machine operating state display screen using a language such as HTML, for example, it may be configured so as to provide the injection molding machine operating state display screen generation parts 204 and 204A, respectively, to the client terminal 3. In this case, the server terminal 2 (injection molding machine operating state provision parts 205 and 205A) is configured so as to, in response to a state provision request for the injection molding machine 1 from the client terminal 3, provide the injection molding machine operating state tables 214 and 214A edited by the injection molding machine operating state editing parts 203 and 203A, respectively, to the client terminal 3 via the communication unit 12.

Modified Example 3

In the first embodiment and second embodiment, the server terminal 2 and server terminal 2A may be provided as virtual servers on a cloud, for example.

Modified Example 4

In the third embodiment and fourth embodiment, the host server terminals 5B and 5C may be provided as virtual servers on a cloud. In addition, the server terminal 2B and server terminal 2C may be provided as virtual servers on a cloud.

Modified Example 5

Although the present embodiments explain management of injection molding machines above, it is possible to apply the same such management to other types of industrial machinery, e.g., machine tools, electrical discharge machines, industrial robots, etc. By configuring in this way, it is possible to understand the operating state of each industrial machine and the position of each operator within a factory.

The entirety or part of the injection molding machine management system of the above explained embodiments can be realized by way of hardware, software or a combination thereof. Herein, realized by way of software indicates being realized by way of a computer reading and executing programs. In the case of constituting by hardware, a part or the entirety of the injection molding machine management system can be constituted by integrated circuits (IC) such as LSI (Large Scale Integrated Circuit), ASIC (Application Specific Integrated Circuit), Gate Array, and FPGA (Field Programmable Gate Array).

In the case of constituting the entirety or part of the injection molding machine management system by software, it is possible to realize, in a computer constituted by a storage unit such as a hard disk or ROM storing the program encoding the entirety or part of the functions of the injection molding machine management system; DRAM storing data required in computation; a CPU and a bus connecting each part, by storing the information required in computation in DRAM, and running the program by the CPU.

These programs can be stored using various types of computer readable media, and supplied to the computer. The computer readable media includes various types of tangible storage media. Examples of computer readable media include magnetic media (e.g., flexible disk, magnetic tape, hard disk drive), magneto-optical media (e.g., magneto-optical disk), CD-ROM (Read Only Memory), CD-R, CD-R/W, and semiconductor memory (e.g., mask ROM, PROM (programmable ROM), EPROM (Erasable PROM), flash ROM, and RAM (Random Access Memory)). In addition, these programs may be distributed by way of being downloaded to the computer of a user via a network.

EXPLANATION OF REFERENCE NUMERALS

100, 100A, 100B, 100C injection molding machine management system
1 injection molding machine
10, 10A control unit
101 operator ID information registration processing part
102 injection molding machine operating information creation/update processing part
103 injection molding machine operating information update part
11 storage unit
12 communication unit
13 input unit
14 display unit
15 injection unit
16 clamping unit
2, 2A, 2B, 2C server terminal
20, 20A control unit
201, 201A operator positional information acquisition part
202, 202A injection molding machine operating information acquisition part
203, 203A injection molding machine operating state editing part
204, 204A injection molding machine operating state display screen generation part
205, 205A injection molding machine operating state provision part
206, 206A work instruction information notification part
21, 21A storage unit 211 operator positional information
212 injection molding machine positional information
213 operator information table
214, 214A injection molding machine operating state table
214A1 injection molding machine operating information table
215 operation/work sharing correspondence information table
22 communication unit
23 input unit
24 display unit
3 client terminal
30 control unit
301 login processing part
302 injection molding machine operating state display control part
31 storage unit
32 communication unit
33 input unit
34 display unit
4 molding factory internal network
400 position detection system
41 wireless terminal
42 wireless receiver (wireless base station)
43 position detection engine
50 injection molding machine group
5B host server terminal

What is claimed is:

1. An injection molding machine management system comprising:
a server terminal; and
a plurality of injection molding machines which are communicably connected with the server terminal,
wherein the injection molding machine includes a control unit and an input unit,
wherein the control unit of the injections molding machine includes an injection molding machine operating information upload part that sends injection molding machine operating information of the injection molding machine to the terminal server, and an operator ID information registration processing part that transmits, to the server terminal, operator ID information of an operator who operates the injection molding machine inputted via the input unit, and injection molding machine ID information of the injection molding machine,
wherein the server terminal includes a storage unit and a control unit,
wherein the storage unit stores positional information of each of the injection molding machines within a molding factory,
wherein the control unit of the server terminal has:
an operator positional information acquisition part that acquires operator positional information within the molding factory of an operator operating each of the injection molding machines;
an injection molding machine operating information acquisition part that acquires the injection molding machine operating information of each of the injection molding machines from each of the injection molding machines; and
an injection molding machine operating state display screen generation part that generates a display screen for simultaneously displaying arrangement positions of each of the injection molding machines and a work position of each operator within the molding factory, based on operator positional information within the molding factory of the operators acquired by the operator positional information acquisition part, and positional information of the injection molding machines stored in the storage unit,
wherein the operator positional information acquisition part acquires an arrangement position of the injection molding machine as the operator positional information of the operator, based on the operator ID information and the injection molding machine ID information transmitted from the operator ID information registration processing part, and
wherein the injection molding machine operating state display screen generation part further generates a display screen for displaying the operating information of each of the injection molding machines within the molding factory simultaneously with the arrangement positions of the injection molding machines and work positions of each operator, based on operating information of each of the injection molding machines acquired by the injection molding machine operating information acquisition part.

2. The injection molding machine management system according to claim 1, wherein the operator ID information at least includes one among qualification information and work sharing information of the operator.

3. The injection molding machine management system according to claim 1, wherein the injection molding machine operating information includes at least one among information of whether the injection molding machine is during automatic operation, during semi-automatic operation, during stop, an alarm has occurred, a production number of the injection molding machine, and a scheduled production number of the injection molding machine.

4. The injection molding machine management system according to claim 3,
wherein the control unit of the server terminal further includes a work instruction information notification part that outputs work instruction information related to the operator, based on injection molding machine operating information of the plurality of the injection molding machines acquired by the injection molding machine operating information acquisition part, operator positional information of the operators, and positional information of the injection molding machines.

5. The injection molding machine management system according to claim 1, further comprising:
a first server terminal;
a second server terminal; and
an injection molding machine group that includes the second server terminal and a plurality of the injection molding machines,
wherein the second server terminal is communicably connected with the first server terminal,
wherein functions of the server terminal are decentralized to the first server terminal and the second server terminal, and
wherein the first server terminal centrally manages arrangement information of each of the injection molding machines included in the injection molding machine group and work information of each operator.

* * * * *